(12) United States Patent
Lee et al.

(10) Patent No.: US 9,179,795 B1
(45) Date of Patent: Nov. 10, 2015

(54) COOKING PAN SYSTEM HAVING FOLDABLE HANDLE

(71) Applicants: Dong Woo Lee, Busan (KR); Min Gyu Park, Busan (KR)

(72) Inventors: Dong Woo Lee, Busan (KR); Min Gyu Park, Busan (KR)

(*) Notice: Subject to any disclaimer, the term of this patent is extended or adjusted under 35 U.S.C. 154(b) by 0 days.

(21) Appl. No.: 14/722,614

(22) Filed: May 27, 2015

(30) Foreign Application Priority Data

May 29, 2014 (KR) .......................... 10-2014-0065133

(51) Int. Cl.
| | |
|---|---|
| A47J 45/07 | (2006.01) |
| A47J 27/00 | (2006.01) |
| A47J 36/06 | (2006.01) |
| A47J 36/34 | (2006.01) |
| B65D 25/28 | (2006.01) |

(52) U.S. Cl.
CPC ................ *A47J 27/002* (2013.01); *A47J 36/06* (2013.01); *A47J 36/34* (2013.01); *B65D 25/28* (2013.01); *B65D 2525/283* (2013.01); *B65D 2525/286* (2013.01)

(58) Field of Classification Search
CPC ........ A47G 37/10; A47G 27/00; A47G 45/06
USPC .............. 220/573.1, 753, 757, 762, 763, 764; 16/425, 408
See application file for complete search history.

(56) References Cited

U.S. PATENT DOCUMENTS 6,220,477 B1 * 4/2001 Schneider ..................... 220/763
7,762,182 B2 * 7/2010 Garziera ........................ 99/425

FOREIGN PATENT DOCUMENTS

KR  2004054550000  1/2006

* cited by examiner

*Primary Examiner* — Anthony Stashick
*Assistant Examiner* — Raven Collins

(57) ABSTRACT

A cooking system comprises: a pan; a support having a neck and a ball attached through the neck to the pan, the ball having a protrusion and an elongate opening to receive a pin rod having inflated ends; a cover unit rotatably covering the ball and having a first and second cover, the first cover having an arc opening to receive and rotatably guide the protrusion in the arc opening; an elastic media provided between the first and second covers to elastically contain the rod in the elongate opening of the ball; and a handle extending from a selected one of the first and second covers, the rod ends being manually pulled out of the ball against elastic pushing of the elastic media.

11 Claims, 4 Drawing Sheets

COOKING PAN SYSTEM HAVING FOLDABLE HANDLE

CROSS REFERENCE

This application claims foreign priority under Paris Convention to Korean Patent Application No. 10-2014-0065133 filed 29 May 2014, with the Korean Intellectual Property Office, which is incorporated herein with its entirety.

BACKGROUND

This invention relates to a cooking pan having a handle, more particularly, to a cooking pan system having a foldable handle, facilitating storage of the pan system by conveniently folding the handle to a side of the pan system and enabling a vertical stacking on top of another in a limited storage space.

Most cooking pans on the market are introduced with handles fixedly attached to the pans, which in turn occupy large space in the kitchen cabinet and make it inconvenient or difficult to stack one on another. Further, when this type of handle-fixed cookware is placed on a dining table serving as a plate, it tends to prevent convenient use of utensils with blockage of the cookware handles. This disadvantage has stimulated developments of techniques related to cooking pans with foldable handles.

Korean Publication No. 20-045455 introduces a folding style handle structure in cookware, comprising a grip, a bracket protruding from the outer wall of cookware, an arm between the bracket and the grip, a hinge shaft connecting with one part of arm and the bracket, another hinge shaft connecting the other part of arm and the grip, and foldable handle with supportive member to sustain the grip.

Conventional fordable handles to cooking pans are formed folded up or down, and/or towards over the pan space of cookware, which causes inconvenience when stacked in kitchen cabinet for storage. A necessity to overcome the conventional inconvenience comes from this existing problem so as to develop a technique to satisfy the needs of users including a convenient storage and esthetic satisfaction.

SUMMARY OF THE INVENTION

Accordingly, the present invention is contrived to solve the disadvantages of the prior art.

An objective of the present invention is to provide a cooking pan system facilitating storage of the pan system by conveniently folding the handle to a side of the pan system.

Another objective is to provide a cooking pan system enabling a vertical stacking on top of another in a limited storage space.

A further objective is to provide a cooking pan system accommodating user needs to control pan handles thus improving product satisfaction.

In order to satisfy these and other objectives, a cooking system according to the present invention comprises: a pan for cooking food; a support having a neck and a ball, wherein the ball is attached through the neck to the pan, wherein the ball has a protrusion and an elongate opening to receive a pin rod having inflated ends; a cover unit rotatably covering the ball and having a first and second cover, wherein the first cover has an arc opening to receive and rotatably guide the protrusion in the arc opening; an elastic media provided between the first and second covers to elastically contain the rod in the elongate opening of the ball so as to maintain the cooking system in a cooking mode; a handle extending from a selected one of the first and second covers, wherein the rod ends are manually pulled out of the ball against elastic pushing of the elastic media and the handle is subsequently rotated to a predetermined degree and folded toward a side of the pan so as to switch the cooking system to a storage mode.

The support has a base plate fixed to the pan. The pan is substantially circular. The neck and the ball are formed of a metallic material. The inflated rod ends are each formed in an oval shape to stay out of the cover unit in the cooking mode. The second cover has a bottom substantially waved to facilitate folding of the cover unit toward the side of the pan. The handle is formed to look straight when viewed atop and waved when viewed aside to substantially match a peripheral curve of the pan side. The elastic media is a pair of parallel springs elastically pushing the rod toward the pan so as to keep the rod in the arc opening during the cooking mode. The rotation of the handle effects that of the cover unit. The handle is formed to extend from the first cover. The arc opening is formed such that the handle is rotatable by 90 degrees clockwise or counterclockwise with the protrusion kept in the arc opening.

The advantages of the present invention are: (1) the pan handle is foldable to either side of the cooking system to minimize a storage space; (2) the cooking pan system is easily stackable on another maximizing usability of a limited kitchen cabinet space; and (3) the user can manually control pan handles to the user's need.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
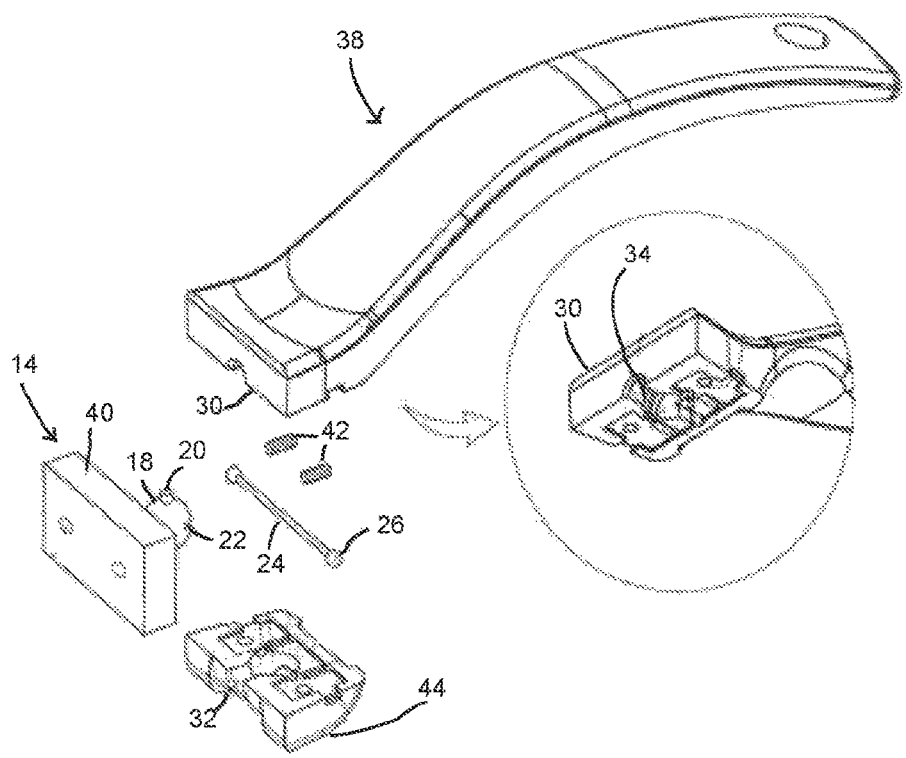
FIG. 1 is an exploded perspective view showing a cooking pan system according to the present invention.
Figure 2:
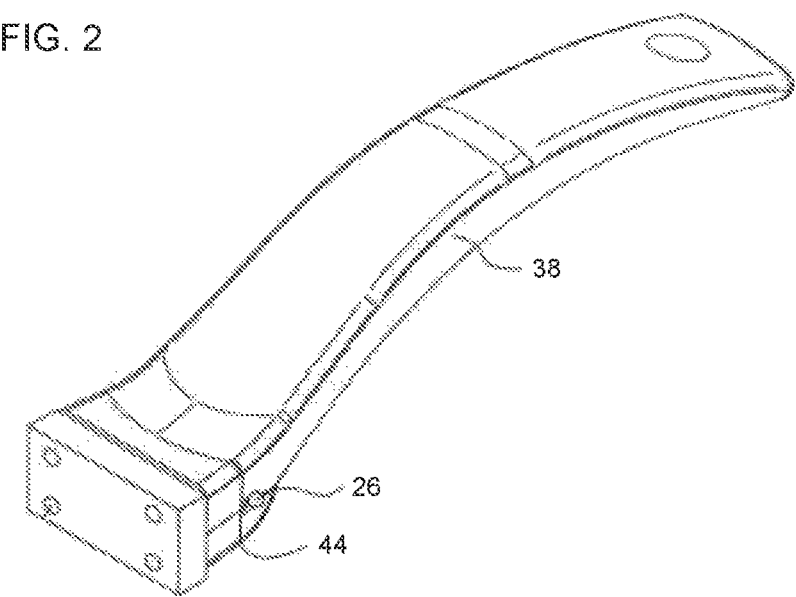
FIG. 2 is a perspective view showing a handle of the cooking pan system according to the present invention.
Figure 3:
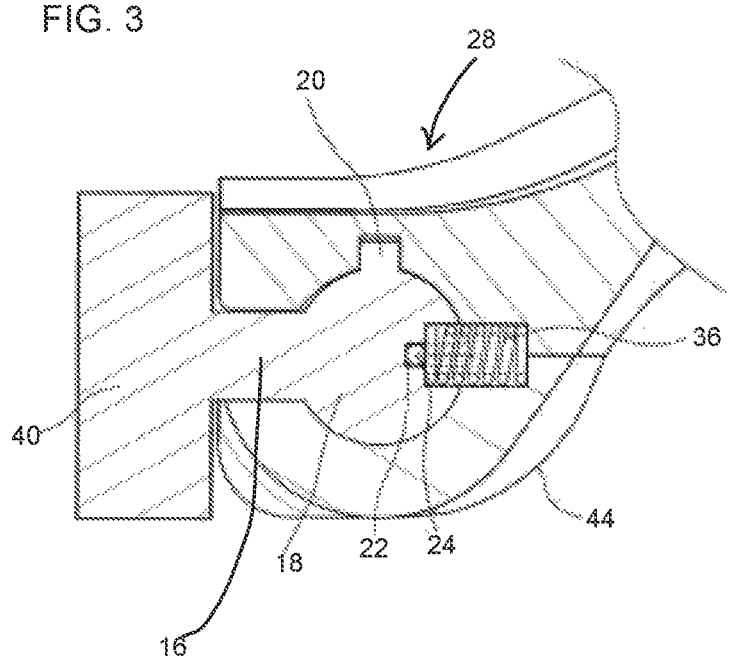
FIG. 3 is a cross-sectional view showing mechanism of the handle folding according to the present invention.
Figure 4:
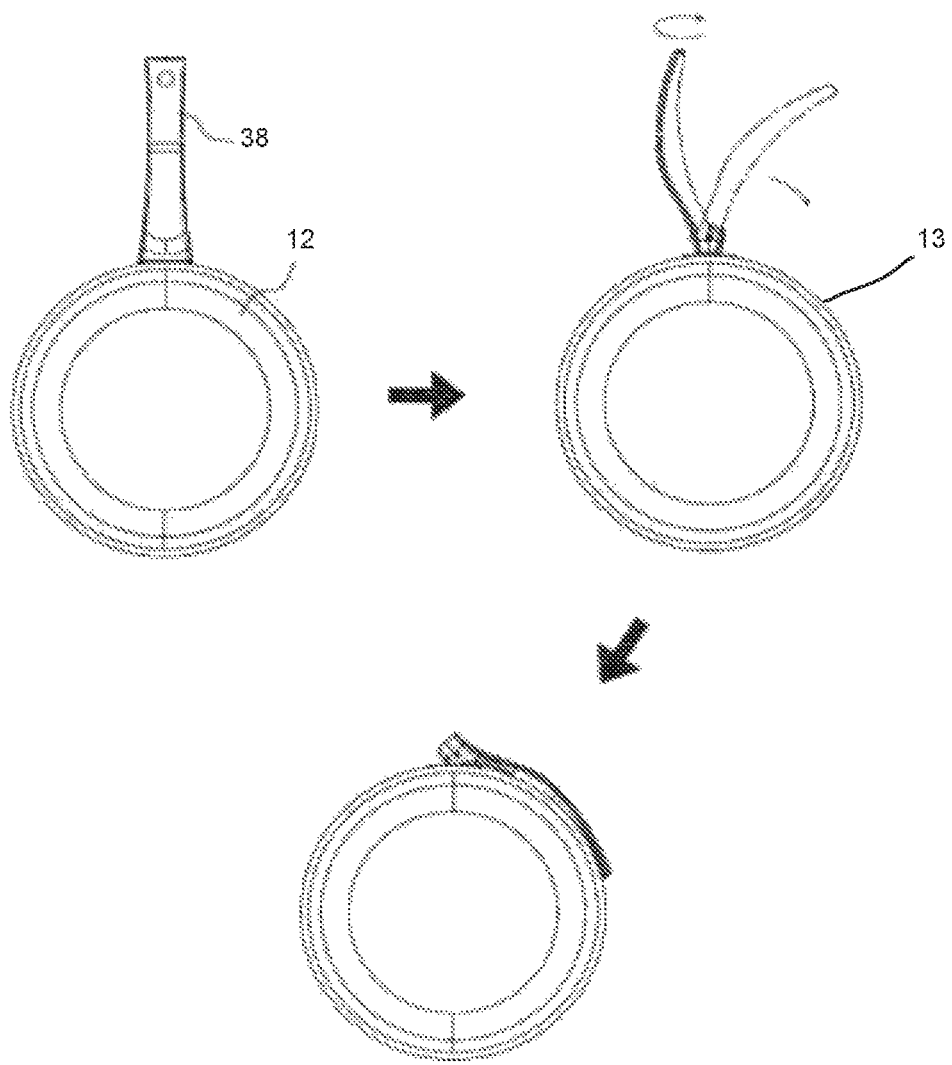
FIG. 4 is a view showing steps of folding the handle of the cooking pan system according to the present invention.
Figure 5:
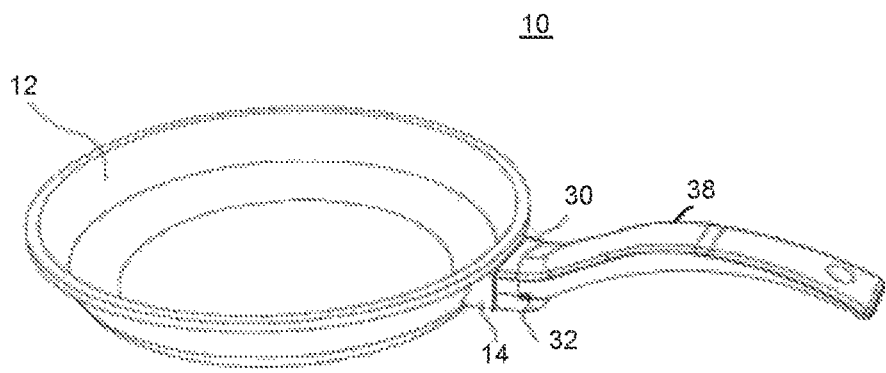
FIG. 5 is a perspective view showing the cooking pan system with the handle unfolded according to the present invention.
Figure 6:
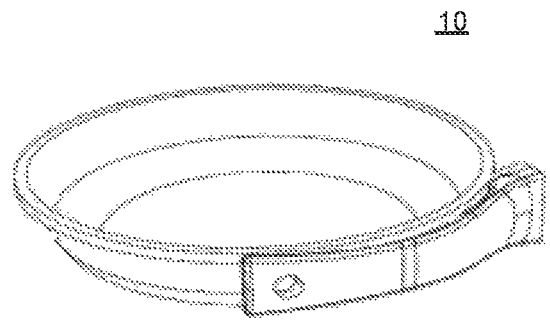
FIG. 6 is a perspective view showing the cooking pan system with the handle folded according to the present invention.

FIGS. 1-6 each illustrate a cooking pan system 10 according to embodiment of the present invention.

The cooking pan system 10 comprises a pan 12 for accommodating and cooking food. The cooking pan system 10 includes a support 14 having a neck 16 and a ball 18. The ball 18 is attached through the neck 16 to the pan 12. The ball 18 has a protrusion 20 and an elongate opening 22 to receive a pin rod 24 having inflated ends 26. The pan 12 could be shaped circular, rectangular, oval or other form.

A cover unit 28 is provided to rotatably cover the ball 18. The cover unit 28 has a first 30 and second 32 cover. The first cover 30 has an arc opening 34 to receive and rotatably guide the protrusion 20 in the arc opening 34. The arc opening 34 is preferably formed in a 180 degree arc hollowed above a horizontal line allowing the protrusion 20 to rotate therein when needed. The cover unit 28 may be formed either of a plastic material or of a metallic material. In a preferred mode, the cover unit 28 is formed of a heat-resistant polyamide.

For a better performance, an elastic media 36 is provided between the first 30 and second 32 covers to elastically contain the rod 24 in the elongate opening 22 of the ball 18 so as to maintain the cooking system 10 in a cooking mode.

To improve usability of the cooking pan system 10, a handle 38 is provided extending from a selected one of the first 30 and second 32 covers. Here, the rod ends 26 are manually pulled out of the ball 18 with a user's thumb and index finger against elastic pushing of the elastic media 36 and the handle 38 is subsequently rotated to a predetermined degree and folded toward a side 13 of the pan 12 so as to switch the cooking system 10 to a storage mode.

The support 14 may include a base plate 40 fixed to the pan 12 to improve product reliability. In this construction, the neck 16 is fixed to the base plate 40 which is then formed between the pan 12 and the neck 16. In a preferred version, the base plate 40, the neck 16 and ball 18 are formed in a single metallic material in a single molding format.

In an improved embodiment, the pan 12 may be substantially circular. The neck 16 and the ball 18 are formed of a metallic material. The inflated rod ends 26 are each formed in an oval shape to stay out of the cover unit 28 in the cooking mode.

The second cover 30 has a bottom 44 substantially waved to facilitate folding of the cover unit 28 toward the side 13 of the pan 12 in the storage mode.

The handle 38 is formed to look straight when viewed atop and waved when viewed aside to substantially match a peripheral curve of the pan side 13.

The elastic media 36 is formed of a pair of parallel springs 42 elastically pushing the rod 24 toward the pan 12 so as to keep the rod 24 in the arc opening 34 during the cooking mode.

The rotation of the handle 38 effects that of the cover unit 28. The handle 38 is preferably formed to extend from the first cover 28.

The arc opening 34 is formed such that the handle 38 is rotatable by 90 degrees clockwise or counterclockwise with the protrusion 20 kept in the arc opening 34.

For the present invention shown and described with reference to different embodiments thereof, variations in form, detail, compositions and operation may be made without departing from the spirit and scope of the present invention as defined by the accompanying claims.

What is claimed is:

1. A cooking system, comprising:
a pan for cooking food;
a support having a neck and a ball, wherein the ball is attached through the neck to the pan, wherein the ball has a protrusion and an elongate opening to receive a pin rod having inflated ends;
a cover unit rotatably covering the ball and having a first and second cover, wherein the first cover has an arc opening to receive and rotatably guide the protrusion in the arc opening;
an elastic media provided between the first and second covers to elastically contain the rod in the elongate opening of the ball so as to maintain the cooking system in a cooking mode; and
a handle extending from a selected one of the first and second covers, wherein the rod ends are manually pulled out of the ball against elastic pushing of the elastic media and the handle is subsequently rotated to a predetermined degree and folded toward a side of the pan so as to switch the cooking system to a storage mode.

2. The cooking system of claim 1, wherein the support has a base plate fixed to the pan.

3. The cooking system of claim 1, wherein the pan is substantially circular.

4. The cooking system of claim 1, wherein the neck and the ball are formed of a metallic material.

5. The cooking system of claim 1, wherein the inflated rod ends are each formed in an oval shape to stay out of the cover unit in the cooking mode.

6. The cooking system of claim 1, wherein the second cover has a bottom substantially waved to facilitate folding of the cover unit toward the side of the pan.

7. The cooking system of claim 1, wherein the handle is formed to look straight when viewed atop and waved when viewed aside to substantially match a peripheral curve of the pan side.

8. The cooking system of claim 1, wherein the elastic media is a pair of parallel springs elastically pushing the rod toward the pan so as to keep the rod in the arc opening during the cooking mode.

9. The cooking system of claim 1, wherein the rotation of the handle effects that of the cover unit.

10. The cooking system of claim 1, wherein the handle is formed to extend from the first cover.

11. The cooking system of claim 1, wherein the arc opening is formed such that the handle is rotatable by 90 degrees clockwise or counterclockwise with the protrusion kept in the arc opening.

* * * * *